UNITED STATES PATENT OFFICE.

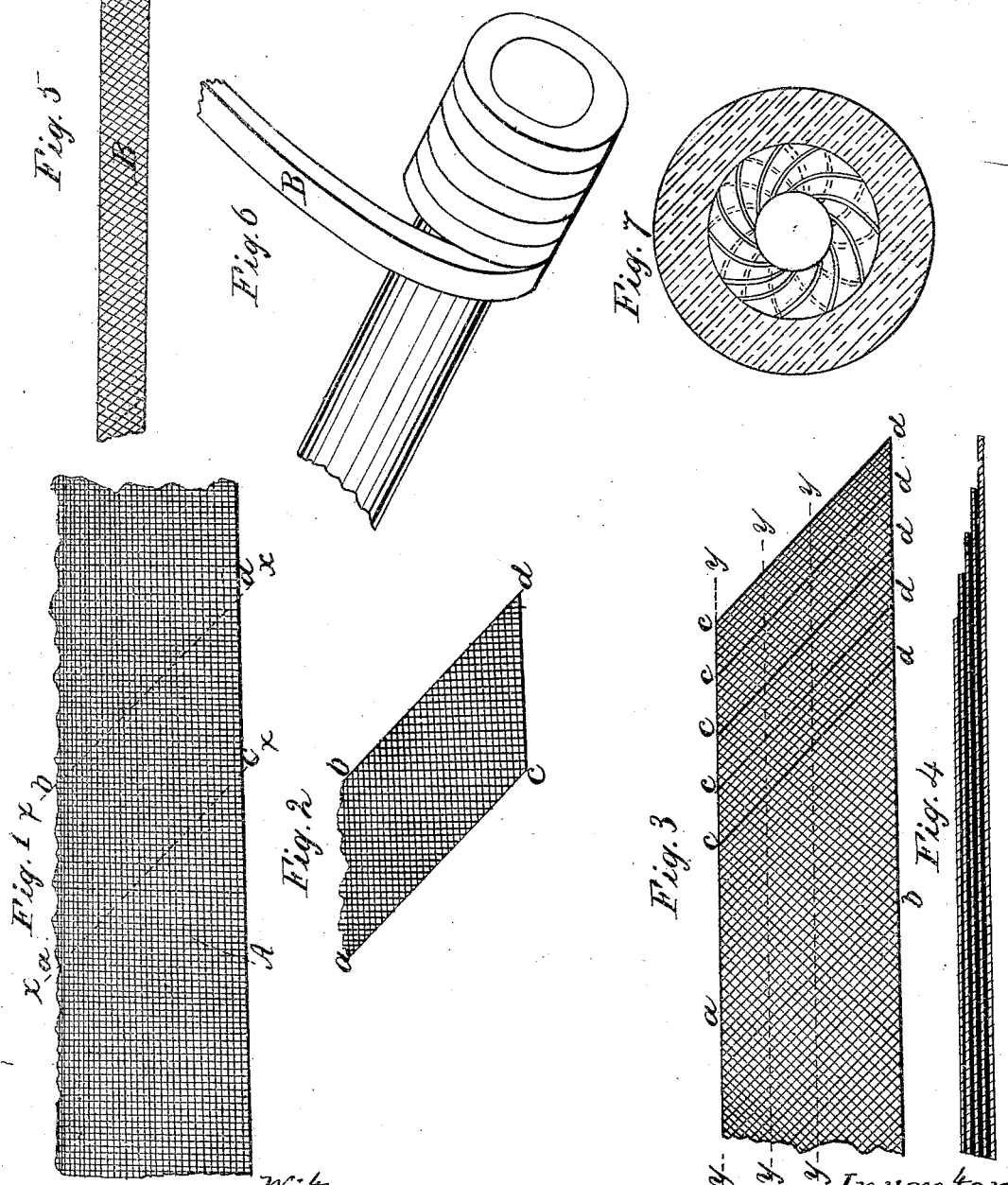

JAMES BENNETT FORSYTH, OF ROXBURY, MASSACHUSETTS.

IMPROVED ROLLER FOR CLOTHES-WRINGERS.

Specification forming part of Letters Patent No. 59,798, dated November 20, 1866.

*To all whom it may concern:*

Be it known that I, JAMES BENNETT FORSYTH, of Roxbury, in the county of Norfolk and State of Massachusetts, have invented certain Improvements in Rollers for Clothes Wringers, Washers, &c., of which the following is a full, clear, and exact description, reference being had to the accompanying drawings, making part of this specification, in which—

Figure 1 is a plan of a sheet of rubber and cloth as it comes from a calendering-roll. Fig. 2 represents a strip of the sheet of rubber and cloth cut in the direction of the lines $x\,x$ of Fig. 1. Fig. 3 is a plan of several of these strips placed on each other. Fig. 4 is a vertical section on the line $y\,y$ of Fig. 3. Fig. 5 is a plan of a narrow band cut from the material as arranged in Fig. 3, the width of the band being equal to the distance between the lines $y\,y$. Fig. 6 represents a mandrel with the narrow band wound around it. Fig. 7 is a transverse vertical section through a wringer-roll, the core of which is formed from the band in the manner shown in Fig. 6.

Various methods of attaching rubber rolls to their shafts have been devised; but I am not aware of any in which the adhesion of the parts is sufficiently great to prevent the roll from becoming loosened and turning on its shaft.

To provide a means whereby the connection will be permanent, and effectually resist the strain to which the roll is subjected, is the object of my invention; which consists in forming the roll upon a core composed of strips cut from several thicknesses of rubber and cloth, the strips being wound around and snugly laid together upon a shaft or mandrel, so that the ends of the fibers of the rubber cloth are placed against the shaft, and the direction of their length is nearly at right angles thereto, instead of simply wrapping the rubber cloth around the shaft, and laying the warp or filling nearly concentric therewith.

To enable others skilled in the art to understand and use my invention, I will proceed to describe the manner in which I have carried it out.

In the said drawings, A is a sheet composed of alternate layers of rubber and cloth, united together in the ordinary calendering or friction machines. This sheet A is cut "bias" or diagonally across the length of the fiber, as shown by the lines $x\,x$, Fig. 1, forming long strips $a\,b\,c\,d$, (one of which is seen broken in Fig. 2,) which are now placed upon each other, as seen in Fig. 3, a hand-roller being employed to press each strip upon the one beneath it, so that the surfaces of rubber may be securely cemented and permanently united. The several strips thus united form a sheet of the thickness shown in section, Fig. 4, which is then cut into strips or bands B, Fig. 5, of any suitable width to admit of their being easily wound around a mandrel, (see Fig. 6,) in such manner that the ends of the fibers of the cloth will come in contact with the mandrel, and the alternate layers of rubber will firmly adhere thereto.

The roll is made upon this core by winding rubber sheets around it, and after being wrapped in cloth or metal, or placed in molds, it is then subjected to the vulcanizing process, the rubber in its soft and plastic state filling up all of the inequalities around and between the layers of the core, and thoroughly binding and incorporating the parts together. By forming the strip B in the manner above described, and winding it around the shaft so that the direction of the fiber will lie nearly at right angles to the surface of the shaft, as seen in Fig. 7, instead of laying the warp or filling upon it in a direction nearly concentric therewith, the degree of adhesion of the parts is much greater, the position of the fiber on its end being better adapted to resist any tendency of the roll to become loose and turn on its shaft when subjected to a strain.

The roll can be cured on a mandrel, which may be readily removed and the shaft inserted, or the roll may be cured directly on its shaft.

What I claim as my invention, and desire to secure by Letters Patent, is—

A roll constructed, substantially as described, with a core so formed that the ends of the threads of the cloth will rest upon the shaft, for the purpose set forth.

JAMES BENNETT FORSYTH.

Witnesses:
P. E. TESCHEMACHER,
N. W. STEARNS.